Feb. 1, 1944. H. E. F. C. LINGENBRINK 2,340,671
INJECTOR
Filed Feb. 4, 1942 2 Sheets-Sheet 2

WITNESS:

INVENTOR
Hermann E. F. C. Lingenbrink
BY
ATTORNEYS.

Patented Feb. 1, 1944

2,340,671

UNITED STATES PATENT OFFICE 2,340,671

INJECTOR

Hermann E. F. C. Lingenbrink, Hilltown, Pa., assignor to William Sellers & Company, Incorporated, Philadelphia, Pa., a corporation of Pennsylvania Application February 4, 1942, Serial No. 429,463

8 Claims. (Cl. 103—271)

This invention relates to an improvement in injectors used for the supplying of feed water to steam boilers.

More particularly, this invention relates to the provision of novel and highly efficient means for operating the steam and water valves of injectors through the medium of fluid pressure.

Generally speaking this invention comprehends the provision of fluid pressure actuated means for the control of the steam valve of an injector so arranged that in starting the injector water will be supplied to the mixing tube of the injector before the steam valve is opened.

More particularly, the fluid pressure actuated means will be so designed and arranged that fluid pressure, remotely controlled by a single operating handle, will be used to open the water valve and permit opening of the steam valve. Again, in the closing of the valves the means will be so arranged that on shutting off the fluid pressure, by manipulation of the operating handle, the steam valve will close ahead of the water valve.

Further in accordance with this invention, fluid pressure operated means for control of the water and steam valves of the injector are operated subject to a control which, in addition to controlling operation of the two valves, is adapted also for the control of the amount of water supplied to the injector.

Figure 1:
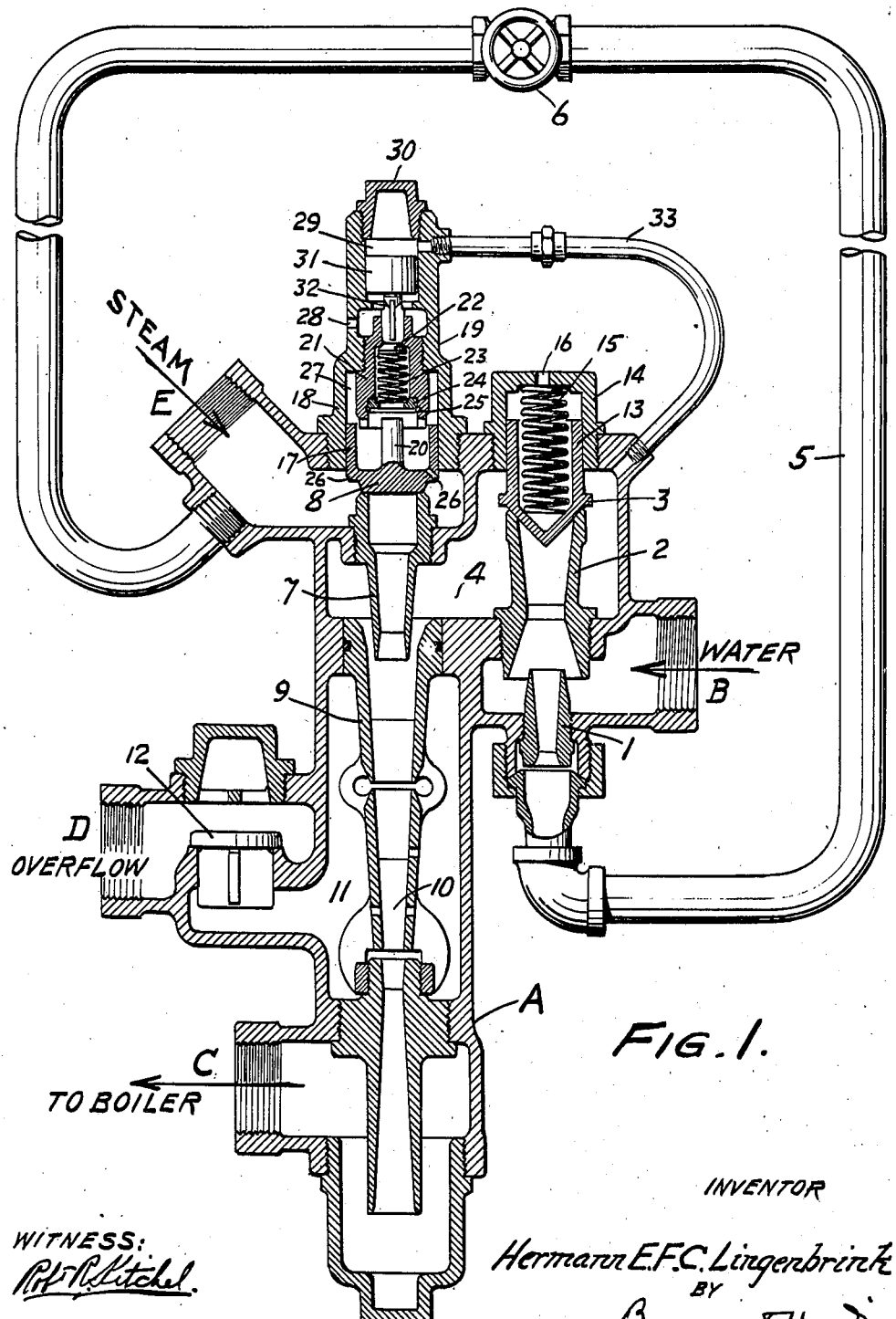
Figure 1 is a cross-sectional view of an injector equipped with fluid pressure operated water and steam valves according to this invention.

Referring more particularly to Figure 1, A indicates a casing provided with a water inlet B, a delivery outlet C, an overflow outlet D and a steam inlet E.

Within the casing adjacent to the water inlet B is a steam nozzle 1 adapted to direct water into and through a mixing tube 2, controlled by a water valve 3 and discharging into a water chamber 4. The steam nozzle 1 is supplied with steam from the steam inlet E through a pipe 5 under control of a manually operated regulating valve 6. A main steam nozzle 7 controlled by a steam valve 8 is adapted to receive steam from the steam inlet E and to discharge into a mixing tube 9 in communication with the water chamber 4 and with a forcing tube 10, arranged in the usual manner for overflow into an overflow chamber 11. The overflow chamber 11 communicates with the overflow outlet D under control of an overflow valve 12. The usual line check valve (not shown) is provided in connection with the delivery outlet C.

The water valve 3, which in the embodiment shown seats on a seat formed on the end of the mixing tube 2, is provided with a cylindrical extension 13 which extends into a cylindrical guide 14, threaded into the casing A, and a spring 15 extending between the valve and the head of the guide 14, serves to seat the valve 3 when the injector is shut down, and maintain it seated while the injector is idle. The guide 14 is provided with vent 16 in its head.

The steam valve 8, provided with a passage 26 for steam from the steam inlet E, seats on a seat formed on the end of the steam nozzle 7 and is provided with a cylindrical extension 17 extending into a cylinder 18 formed in the casing 19, threaded into the casing A. The steam valve is also provided with an upwardly extending stem 20. The upper end of cylinder 18 is closed by means of a centrally apertured member 21, the aperture through which is adapted to be controlled by a valve 22, closed, when the injector is idle, by a spring 23, working between the valve and a spring seat 24 supported on a ring 25. The centrally apertured member 21 forms an annular space 27 within the cylinder into which the extension 17 enters, with a sliding fit, when the steam valve is open.

Beyond the valve 22 the central aperture in the member 21 communicates with atmosphere through a passage 28 in casing 19.

In the top of casing 19, above the valve 22 is formed a cylinder 29, closed by a threaded head 30 and containing a piston 31, which is connected to the valve 22, for its operation, through the fins 32 of valve 22. The cylinder 29 at a point above the piston 31 is connected to the water chamber 4 by a pipe 33.

In the operation of the embodiment of this invention described above, assuming that the water valve 3 and steam valve 8 are in closed position as shown in the drawings, when it is desired to start the injector the regulating valve 6 is opened with admission of steam to the steam nozzle 1 adjacent the water inlet B. Steam issuing from the nozzle 1 picks up water and discharges it into the mixing tube 2. The kinetic energy of the water and steam passing into the mixing tube 2 opens the water valve 3 against its spring 15. Water then fills the water chamber 4 and while some of the water passes into the combining tube 9, pressure is developed in the chamber 4, which passes through the pipe 33 into cylinder 29, causing piston 31 to move downwardly to open valve 22 against its spring 23 through the medium of fins 32.

Until the valve 22 is opened the steam valve 8 remains closed, due to the pressure on its upper side from steam passing from the steam inlet through the passage 26. When, however, the valve 22 is opened, pressure escapes from the upper side of the valve 8 to atmosphere through the opening 28, and the valve is then opened by steam pressure from the steam inlet E on its under side.

As the steam valve 8 opens the extension 17 enters the annular space 27 and the stem 20 enters the aperture in the spring seat 24, in which it has a sliding fit. The opening movement of the valve 8 is cushioned by the fact that pressure above the valve in its opening movement can escape only around the stem 20.

As will be obvious, when the steam valve 8 is open steam from the steam inlet E passes through the steam nozzle 7 into the mixing and combining tubes 9, 10, while water enters the combining tube 9 through the water chamber 4.

As will be observed, the water valve inevitably opens before the steam valve opens, inasmuch as the opening of the steam valve is dependent upon the development of pressure in water chamber 4, which is developed only after the water valve is opened. Conversely, the steam valve will close ahead of the water valve inasmuch as the spring 23, which operates to close valve 22, is of a strength such that it will effect the closing of valve 22, with resultant building up of pressure on the upper side of the valve 8 and its closing, on a predetermined drop in pressure in the water chamber 4. The same result can be obtained by suitably proportioning the areas of piston 31 and valve 22.

In the operation of the injector the amount of water can be accurately controlled through manipulation of the regulating valve 6, it being noted that the regulating valve 6 controls the steam passing through the steam nozzle 1, which in turn controls the amount of water discharged into the chamber 4.

At the same time, if the regulating valve be positioned so that insufficient water is supplied for operation of the injector, the pressure in chamber 4 will drop and consequently the pressure on the piston 31 will drop to a point at which the valve 22 will close under the influence of its spring 23, with consequent closing of the steam valve. Hence, while the valve 6 can be used in the operation of the injector for regulation of the water supply, if too little water be supplied the injector will shut down by closure of the steam valve.

Figure 2:
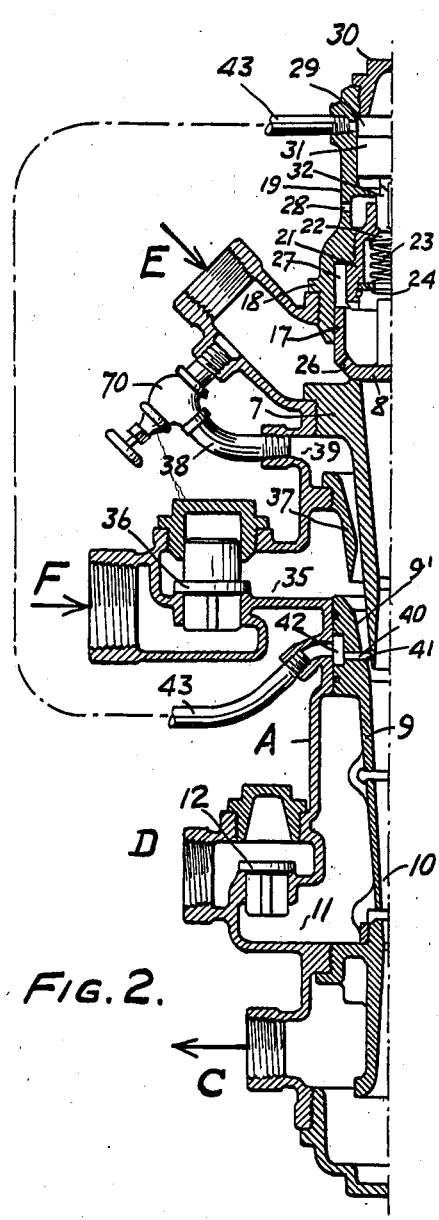
Figure 2 is a fragmentary sectional view of an injector embodying a modification of this invention.

Referring now to Figure 2 in which elements similar to those in the structure shown in Figure 1 are indicated by similar reference characters, a water inlet F is provided for the supply of water to an annular inlet chamber 35 arranged within the casing above the mixing tube 9. The flow of water to the chamber 35 is controlled by a weighted valve 36. A primary steam nozzle 37 is arranged about the steam nozzle 7 for discharge into the mixing tube 9. The primary steam nozzle 37 extends into chamber 35 and its discharge end is spaced from the upper end of the mixing tube 9 and steam is supplied to the nozzle from the steam inlet E through a pipe 38, leading to a steam chamber 39 and controlled by a manually operated control valve 70.

Below the top of the mixing tube 9 and slightly above the discharge end of the steam nozzle 7, an annular laterally extending passage 40 is formed in the wall of the mixing tube immediately below which the bore of the mixing tube is restricted to form a ledge or baffle 41. The annular passage 40 communicates with an annular chamber 42 which is connected by a pipe 43 to the upper end of cylinder 29 of the steam valve (8) control mechanism. The upper portion 9' of the mixing tube 9 above the passage 40 forms a primary mixing tube.

The operation of the modification of this invention as described in connection with Figure 2 will be, it is believed, substantially obvious. However, assuming the injector to be shut off with the steam valve 8 and water valve 36 closed, and it being desired to start the injector, the valve 70 will be opened, admitting steam to the chamber 39 and the primary steam nozzle 37, from which it will be discharged into the mixing tube 9. The discharge of steam from the primary steam nozzle 37 will cause a vacuum in chamber 35, which will operate to cause the water valve 36 to be opened with, as a result, a supply of water to chamber 35 and to the mixing tube 9. The water will, under the influence of steam discharged from the primary steam nozzle 37, attain high velocity in the mixing tube. A small portion of the water passing through the mixing tube will, on meeting the baffle or ledge 41, be diverted into annular passage 40, from which it will pass into chamber 42 and through pipe 43 to cylinder 29. The velocity of the water will be converted to pressure in passage 40, which will act on the piston 31 to open the valve 22 with resultant opening of the steam valve 8, as in the case of the structure heretofore described with reference to Figure 1.

Figure 3:
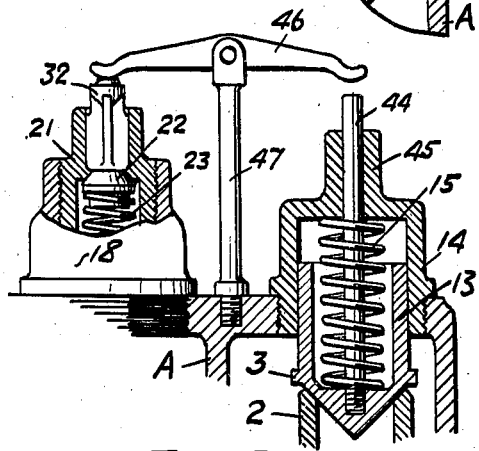
Figure 3 is a fragmentary view, partly broken away and partly in section, showing a modification in detail of the structure shown in Figure 1.

Referring now to Figure 3, the water valve 3 is provided with a stem 44, which extends through a guide 45 formed on the top of the guide 14; and operative connection between the stem 44 and the fins 32 of the valve 22, of the steam valve control mechanism, is formed by the rocker 46 pivoted to a bracket 47 supported from the casing A.

Figure 4:
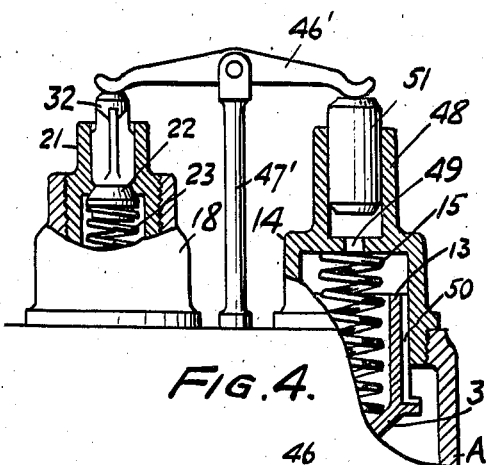
Figure 4 is a fragmentary view, partly broken away and partly in section, showing another modification in detail of the structure shown in Figure 1.

Referring now to Figure 4, a cylinder 48 is mounted on top of the guide 14 and communication between the cylinder and chamber 4 is provided by a passage 49 in the head of guide 14, it being noted, as shown in Figure 4, that in this structure the cylindrical extension 13 on water valve 3 is provided with passages or flutes 50 to afford communication between chamber 4 and the interior of guide 14.

The cylinder 48 is open at its top and contains a piston 51, the upper end of which is operatively connected to the vanes 32 of valve 22, of the steam valve control mechanism, through the rocker 46' pivoted to a bracket 47'.

The operation of the modifications of the structure shown in Figures 3 and 4 will, it is believed, be obvious. However, in the modification shown in Figure 3, when the water valve 3 opens under the influence of pressure in the mixing tube 2, the stem 44 of the valve 3 will operate through the rocker 46 to open the valve 22 with consequent opening of the steam valve 8 as heretofore described with reference to Figure 1.

In the modification shown in Figure 4, when the water valve 3 opens a fluid pressure is developed in chamber 12. Fluid pressure from the chamber will pass through passage 49 and raise piston 51, which will effect opening of the valve 22 through the medium of rocker 46'. Opening of the valve 22 will, as in the case of the structure heretofore described with reference to Figure 1, result in opening of the steam valve 8.

Figure 5:
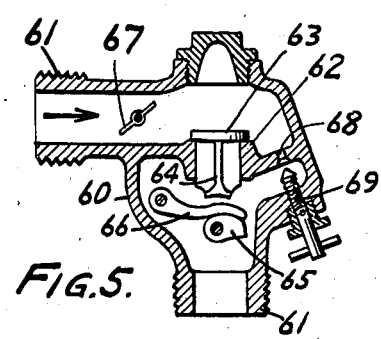
Figure 5 is a sectional view of a regulating valve showing details of construction.

Referring now to Figure 5, the control valve shown may be used in place of valve 6, Figure 1, or in place of valve 70, Figure 2. The valve comprises a casing 60, provided with threaded nipples 61, 61 for connection into a pipe line, within which is formed a valve seat 62 on which is adapted to seat a valve 63 adapted to control the flow of fluid in the direction of the arrow. The valve 63 is provided with guide fins 64 and is adapted to be opened by means of a manually operated cam 65 through the medium of a pivoted lever 66 upon which the cam acts and which, under the influence of the cam, bears on the end of the guide fins 64 on the valve. Ahead of the valve 63 is a butterfly valve 67, adapted to be manually controlled. A bypass 68, with respect to valve 63, is controlled by a manually operated needle valve 69.

In operation of the control feature shown in Figure 5, the valve 63 will be opened by manipulation of the cam 65, and flow through the valve will be controlled by adjustment of the valve 67. Under many circumstances the butterfly valve will be set and the valve 63 thrown wide open when it is desired to start the injector. The needle valve 69 will be adjusted to permit heated fluid, as steam, to bypass the valve 63 in regulated quantity to keep the pipe line from freezing.

It will be understood that it is not intended that this invention shall be limited by the above description and accompanying drawings, since it will be appreciated that various modification in detail may be made therein without departing from the scope of the claims appended hereto. It is further not intended that this application shall be limited to any particular type of injector, since it will be appreciated that it is applicable to injectors of various types having water and steam valves.

What I claim and desire to protect by Letters Patent is:

1. In an injector, in combination, a casing, a water chamber in the casing, a primary steam nozzle, a mixing tube having an inlet for water from said water chamber and adapted to receive steam from the primary steam nozzle, a main steam nozzle arranged to discharge into said mixing tube, means for the supply of steam to the primary and main steam nozzles, a valve for the control of the main steam nozzle and means for the control of said valve for the control of said main steam nozzle adapted to be actuated under fluid pressure derived from the mixing tube.

2. In an injector, in combination, a mixing tube, means including a steam nozzle for the discharge of water under pressure to said mixing tube, a main steam nozzle arranged to discharge into the mixing tube, a conduit for the supply of steam to said steam nozzles, a valve for the control of the main steam nozzle, and means for the control of said valve actuated by fluid pressure derived from said means for the discharge of water into said mixing tube.

3. In an injector, in combination, a casing, a chamber within the casing, means including a steam nozzle for the discharge of water under pressure into the chamber, a mixing tube arranged to receive water from the chamber, a main steam nozzle arranged to discharge into the mixing tube, a conduit for the supply of steam to said main steam nozzle, a valve for the control of the main steam nozzle, and means for the control of said valve actuated by fluid pressure derived from said means for the discharge of water into said chamber.

4. In an injector, in combination, a casing, a chamber within the casing, means including a steam nozzle for the discharge of water under pressure into the chamber, a mixing tube arranged to receive water from the chamber, a main steam nozzle arranged to discharge into the mixing tube, a conduit for the supply of steam to said main steam nozzle, a valve for the control of the main steam nozzle, fluid actuated means for the control of said valve, and a conduit affording communication for fluid pressure between said chamber and said fluid actuated means for the control of said valve.

5. In an injector, in combination, a chamber, means for the discharge of water under pressure into the chamber, means for controlling this water pressure, a mixing tube communicating with the chamber, a steam nozzle arranged to discharge into the mixing tube, a conduit for the supply of steam to said steam nozzle, a valve for the control of said steam nozzle, fluid actuated means for the control of said valve arranged such as to cause closing of said valve when said water pressure in said chamber has reached a predetermined minimum and to cause opening of said valve when said water pressure in said chamber has reached a predetermined maximum.

6. In an injector, in combination, a casing, a water chamber in the casing, means including a mixing tube and a steam nozzle for the supply of water to said chamber under pressure, a spring pressed valve controlling the discharge from said mixing tube, a main mixing tube in communication with said chamber, a main steam nozzle, a conduit for the supply of steam to said main steam nozzle, a valve for the control of said main steam nozzle, fluid actuated means for the control of said last mentioned valve and a conduit affording communication between said chamber and said fluid actuated means for the control of said last mentioned valve.

7. In an injector, in combination, a water inlet, a steam nozzle and mixing tube adjacent said water inlet, a water valve for controlling discharge from said mixing tube, a chamber for receiving discharge from said mixing tube, a main steam nozzle and a main mixing tube adapted to receive water from said chamber, a normally closed valve for controlling the admission of steam to said second steam nozzle, fluid pressure actuated means for controlling the opening of said valve for controlling the admission of steam to said second steam nozzle, means for controlling the admission of steam to said first mentioned steam nozzle and means affording communication for fluid pressure between said chamber and said means for controlling the opening of said valve for controlling the admission of steam to said second steam nozzle.

8. In an injector, in combination, a primary mixing tube, an inlet for water to said tube, a primary steam nozzle discharging into said tube, a chamber arranged to receive discharge from said tube, a spring loaded valve controlling discharge from said tube, a main mixing tube arranged to receive water from said chamber, a main steam nozzle arranged to discharge into said main mixing tube, a conduit for steam communicating with said main steam nozzle, a valve controlling said main steam nozzle, fluid pressure actuated means for controlling the opening of said last mentioned valve, a conduit for the supply of steam to said primary steam nozzle, a manually operated valve for controlling the passage of steam through said last mentioned conduit and a conduit affording passage for fluid pressure from said chamber to said fluid pressure operated means for controlling the opening of said valve controlling said main steam nozzle.

HERMAN E. F. C. LINGENBRINK.